2 Sheets—Sheet 1.

H. C. FALLIN.
Wind-Mill.

No. 197,260. Patented Nov. 20, 1877.

Witnesses

Inventor

2 Sheets—Sheet 2.

H. C. FALLIN.
Wind-Mill.

No. 197,260. Patented Nov. 20, 1877.

Witnesses
Jno. L. Boone
Frank A. Brooks

Inventor
H. C. Fallin
by Dewey & Co
Atty.

UNITED STATES PATENT OFFICE.

HENRY C. FALLIN, OF GRANGEVILLE, CALIFORNIA, ASSIGNOR OF ONE-HALF HIS RIGHT TO VALENTINE GANT.

IMPROVEMENT IN WINDMILLS.

Specification forming part of Letters Patent No. 197,260, dated November 20, 1877; application filed September 27, 1877.

*To all whom it may concern:*

Be it known that I, HENRY C. FALLIN, of Grangeville, in the county of Tulare and the State of California, have invented an Improved Windmill; and I do hereby declare the following to be a full, clear, and exact description of my invention, reference being had to the accompanying drawings.

My invention relates to a novel construction of horizontal windmills; and it consists in the peculiar manner in which the fans are constructed and arranged, as hereinafter described.

Figure 1:
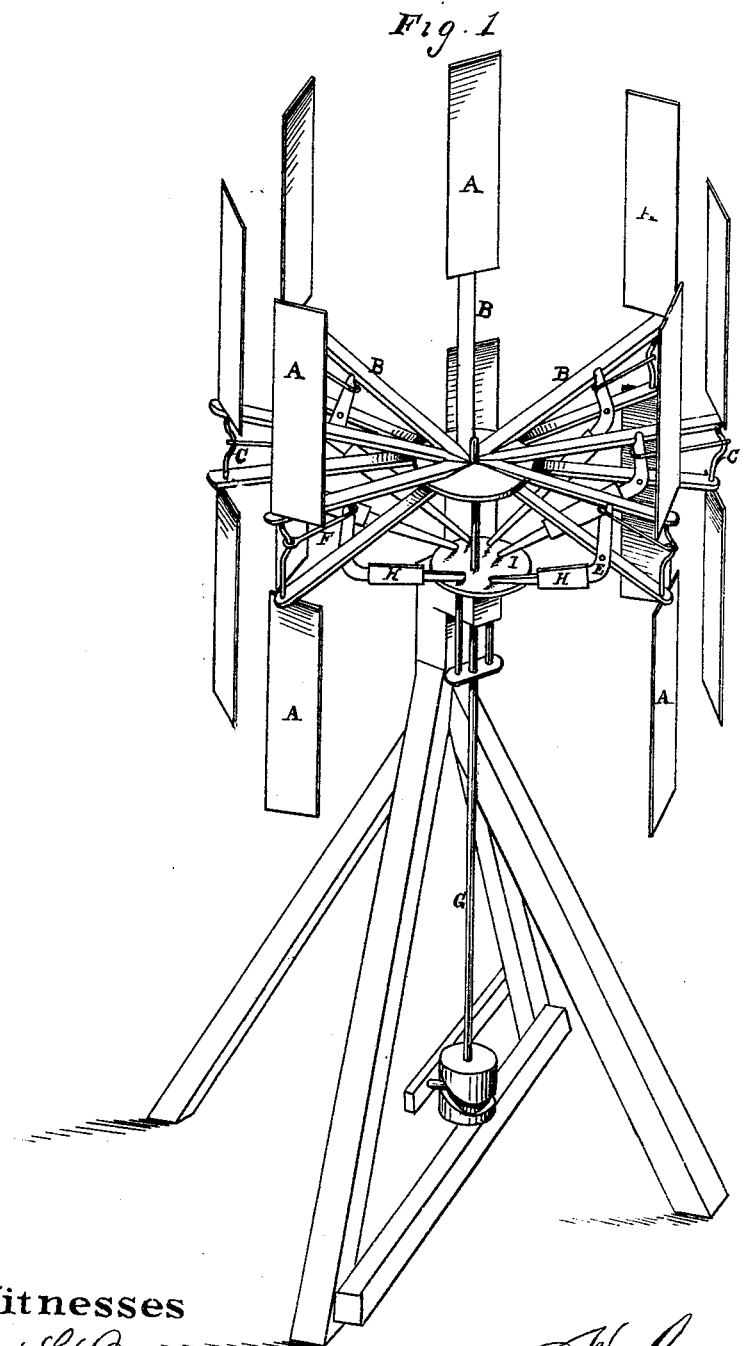
Figure 2:
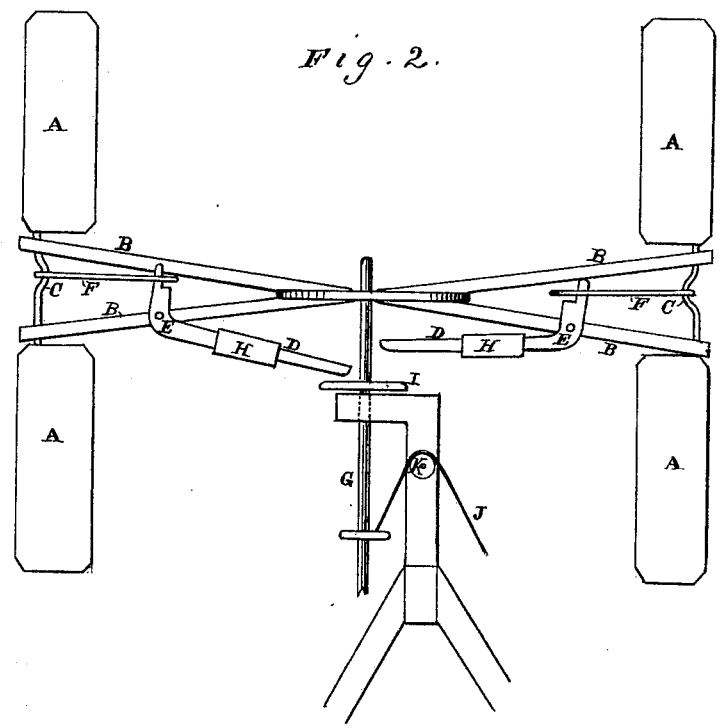
Figure 3:
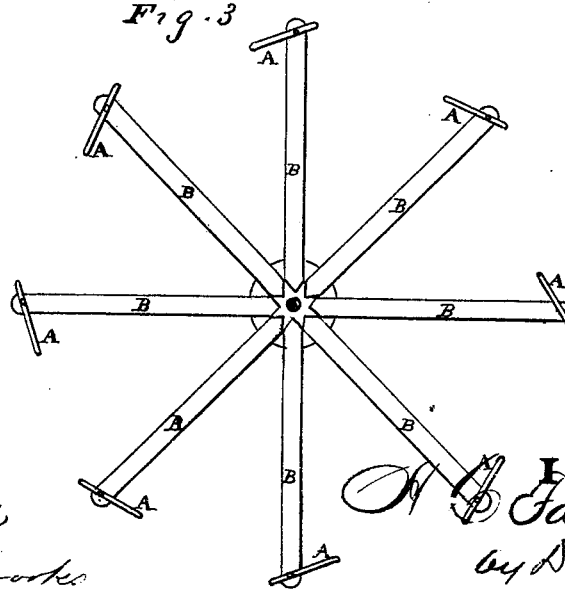

In the accompanying drawings, Figure 1 is a perspective view; Fig. 2, a vertical section, and Fig. 3 a plan.

Let A represent the fans of my wheel, which are hung vertically from the outer ends of horizontal arms or spokes B.

These arms B are fixed to a central plate or hub on the upper end of the main vertical shaft G, and consist of two parts, which meet and are secured at the center, spreading, as shown, toward the outer ends, so as to allow space for the working of a crank and attachment, as hereinafter described, and to give an extended bearing for the shaft to which the fans A are secured. The fans A hang vertically, and are formed in two parts, one above and one below the arms B. The shafts to which the two parts of the fans are attached are secured to the arms, and bent to form a crank, C, between the two parts of each arm B. A rod, D, bent at right angles to form a bell-crank lever, is pivoted on the lower half of each arm B at a point, E, as shown.

These bent rods have arms of unequal length. The shorter arms extend upward, and are connected with the cranks of the fan-shafts by horizontal pitman-rods F. These rods are so formed at their inner ends that, when desired, the fan-shafts may revolve independent of the bent rods D. The long arms of the rods D extend inward toward the central shaft G, as shown, and on these long arms are adjustable weights H, which can be moved to any position on the arms, for the purposes hereinafter described.

The operation of the mill will then be as follows: When there is no wind the fans are held, by the weights and cranks, at an angle of about sixty-five degrees with the arms. As the fans, when the cranks are in this position, offer but little resistance, a light wind sets the fans on one side of the direction in which the wind is blowing edgewise to the wind, those on the other side broadside to the wind, and those in the course of the wind obliquely, all bearing in the same direction to turn the mill.

The crank-shafts are set near to the center of the fans to prevent, as much as possible, the broad side of the fan from turning outward by centrifugal force, and thereby causing backward pressure; but the shafts are far enough from the center to be turned edgewise to the wind.

The weights H on the rods D are to assist in regulating the mill, being made sufficiently heavy to allow the fans to be held constantly edgewise to the wind when the desired speed is gained.

The mill is also regulated by the centrifugal force of the fans; or the two sides of the fans may be balanced by making the short side thick and heavy enough to counterbalance the long side, thereby obviating any centrifugal action, and the mill be regulated entirely by the weights H, which can be moved on the rods D, to increase or diminish the speed of the mill, as desired. In either case the speed of the mill cannot be increased after the wind is strong enough to keep the fans edgewise to the wind, and a gale or storm will have no effect on them, as they will offer scarcely any resistance to the wind over that required to run the mill.

The mill is stopped by raising the weight rods or levers by means of the circular plate I on the central upright shaft G, when the fans, uncontrolled by the weights, will hang out of the wind, offering no resistance to its force. This plate is raised by a cord, J, working in a pulley, K, and attached to the guides, which serve to strengthen the plate I.

By my invention I secure a noiseless, storm-proof, and perfectly self-regulating mill, regulated in one case by the backward pressure caused by the centrifugal force of the fans and the weight combined, and again when the fans are balanced by the weights alone, as herein described.

Having thus described my invention, what I claim, and desire to secure by Letters Patent, is—

1. The radial arms B, secured to the central plate and shaft G, and having their outer ends separated, so as to form bearings for the vertically-placed fans A, substantially as herein described.

2. The fans A, secured to the vertical crank-rods C, so as to present unequal surfaces on each side of the rods, in combination with the bell-crank levers D and adjustable weights H, substantially as and for the purposes herein described.

3. The vertically-moving plate I, sliding loosely upon the central shaft G, and operating to raise the levers D, and throw the vanes out of the wind, substantially as herein described.

In witness whereof I hereunto set my hand and seal.

HENRY C. FALLIN. [L. S.]

Witnesses:
E. A. MANNING,
M. McGEHEE.